United States Patent
Heberlein et al.

(10) Patent No.: US 11,640,631 B2
(45) Date of Patent: May 2, 2023

(54) INDIVIDUALIZED CLEANING AGENT

(71) Applicant: Henkel AG & Co. KGaA, Duesseldorf (DE)

(72) Inventors: Walter Heberlein, Vienna (AT); Vanja Legvart, Zagreb (HR)

(73) Assignee: HENKEL AG & CO. KGAA, Duesseldorf (DE)

( * ) Notice: Subject to any disclaimer, the term of this patent is extended or adjusted under 35 U.S.C. 154(b) by 605 days.

(21) Appl. No.: 16/332,498

(22) PCT Filed: Sep. 7, 2017

(86) PCT No.: PCT/EP2017/072403
§ 371 (c)(1),
(2) Date: Mar. 12, 2019

(87) PCT Pub. No.: WO2018/050523
PCT Pub. Date: Mar. 22, 2018

(65) Prior Publication Data
US 2019/0259076 A1 Aug. 22, 2019

(30) Foreign Application Priority Data
Sep. 15, 2016 (EP) .................... 16188993

(51) Int. Cl.
*A47L 15/44* (2006.01)
*G06Q 30/0601* (2023.01)
(Continued)

(52) U.S. Cl.
CPC ...... *G06Q 30/0621* (2013.01); *C11D 11/0017* (2013.01); *C11D 11/0023* (2013.01); *G06Q 50/04* (2013.01); *Y02P 90/30* (2015.11)

(58) Field of Classification Search
CPC ............... G06Q 30/0621; G06Q 50/04; C11D 11/0017; C11D 11/0023; Y02P 90/30
See application file for complete search history.

(56) References Cited

U.S. PATENT DOCUMENTS 7,091,171 B2 * 8/2006 Caswell ................. C11D 3/505
510/439
7,099,856 B2 * 8/2006 Barangan ............... G06Q 30/02
706/12

(Continued)

FOREIGN PATENT DOCUMENTS

| CN | 1277836 A | 12/2000 |
| CN | 1370219 A | 9/2002 |

(Continued)

OTHER PUBLICATIONS

EPO, International Search Report and Written Opinion issued in International Application No. PCT/EP2017/072403, dated Sep. 29, 2017.

*Primary Examiner* — Mohamed Charioui
*Assistant Examiner* — Christine Y Liao
(74) *Attorney, Agent, or Firm* — Lorenz & Kopf, LLP

(57) ABSTRACT

The present disclosure relates to a method, performed by at least one apparatus (2, 4, 6, 8), the method comprising: obtaining (22) from a user cleaning related information, and determining (42) a composition or a part thereof for an individualized cleaning agent to be produced based on the obtained cleaning related information. The present disclosure also relates to an apparatus, a system, a computer program code and a computer readable storage medium.

13 Claims, 3 Drawing Sheets

(51) Int. Cl.
*C11D 11/00* (2006.01)
*G06Q 50/04* (2012.01)

(56) References Cited

U.S. PATENT DOCUMENTS

| | | |
|---|---|---|
| 2002/0091657 A1 | 7/2002 | Barangan et al. |
| 2003/0014324 A1 | 1/2003 | Donovan et al. |
| 2003/0120534 A1* | 6/2003 | Giacchetti ............. G06Q 30/02 |
| | | 705/26.7 |
| 2008/0027820 A1 | 1/2008 | Brill |
| 2009/0139605 A1* | 6/2009 | Bellens ............... B01F 13/1055 |
| | | 141/313 |
| 2015/0368590 A1 | 12/2015 | Gerke et al. |
| 2017/0121648 A1* | 5/2017 | Patel ................... C11D 3/1266 |

FOREIGN PATENT DOCUMENTS

| | | |
|---|---|---|
| CN | 103853793 A | 6/2014 |
| CN | 104685525 A | 6/2015 |
| JP | 2004508426 A | 3/2004 |
| WO | 0185888 A2 | 11/2001 |
| WO | 2004091501 A2 | 10/2004 |
| WO | 2005069181 A1 | 7/2005 |
| WO | 2007026331 A1 | 3/2007 |

\* cited by examiner

INDIVIDUALIZED CLEANING AGENT

CROSS-REFERENCE TO RELATED APPLICATION

This application is a U.S. National-Stage entry under 35 U.S.C. § 371 based on International Application No. PCT/EP2017/072403, filed Sep. 7, 2017, which was published under PCT Article 21(2) and which claims priority to European Application No. 16188993.6, filed Sep. 15, 2016, which are all hereby incorporated in their entirety by reference.

TECHNICAL FIELD

The present disclosure relates inter alia to a method, an apparatus, a system, a computer program code and a computer readable storage medium for the individualization of a cleaning agent, such as a laundry detergent for example.

BACKGROUND

Various cleaning agents and detergents, such as laundry detergents or dish washing detergents, are known from the prior art.

Different cleaning agents are usually directed to or specifically designed for a certain application. However, even for a particular application, e.g. laundry, again various kinds of cleaning agents are provided. For instance, there are laundry detergents available for washing colored clothes, woolen clothes, for bleaching clothes etc. Just to name one example, document US2015368590 A describes a detergent with improved color protection qualities when used to wash colored textiles, which is substantially achieved in that polymers are used which are molecularly imprinted using dyes.

Moreover, the users of such cleaning agents may have further needs or preferences, e.g. with respect to scent or certain ingredients. Thus, the offer of cleaning agents is further expanded by offering cleaning agents with different scents or which explicitly comprise or do not comprise certain ingredients. As can be seen, a large product portfolio must be provided, in order to be able to meet a specific customer's demand.

This is critical insofar as the buying intention of the customer may be disrupted by critical ingredients or functional misfits with respect to the customer's needs.

One option would be to offer sufficiently large product portfolios to cover every need. However, from an economic viewpoint it is usually not desired to offer too large product portfolios. Additionally, even with a large product portfolio, there is the risk that in view of the numerous options it may not be possible to comply with a specific customer's demand. Further, it may not be possible to provide a cleaning agent with a combination of certain properties, as certain combinations of ingredients may not be compatible with each other and may deteriorate the effectiveness of the cleaning agent over time.

In order to reduce the number of products, one approach may be to sell kits of different cleaning agents or ingredients therefor. However, the customer would need to perform the measuring and mixing of the different cleaning agents or ingredients at home. As a result, the resulting cleaning agent may not be optimally adjusted for the customer's demands, in particular if the user makes mistakes during the process. This approach has the additional downside of having to buy and store several products instead of an all-in-one solution.

Thus, there is the need of providing the customer with a cleaning agent, wherein the customer's individual needs can be complied with to a large extend in a convenient manner.

BRIEF DESCRIPTION OF THE DRAWINGS

The present disclosure will hereinafter be described in conjunction with the following drawing figures, wherein like numerals denote like elements, and.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF SUMMARY

Figure 1:
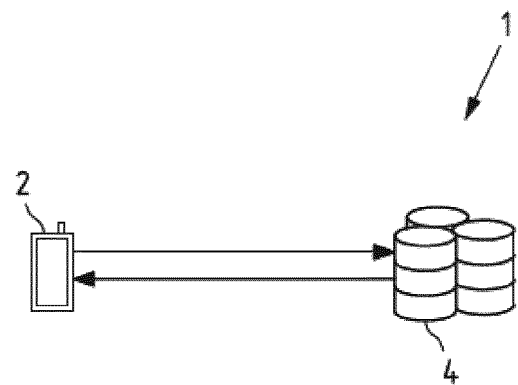
FIG. 1 is a schematic illustration of an exemplary embodiment of an apparatus and a system as contemplated herein.

Certain aspects of the present disclosure have the effect of complying with the customer's individual needs with respect to cleaning agents in a convenient way.

Methods, apparatuses, and systems of determining a composition of an individualized cleaning agent are provided. In an exemplary embodiment, a method includes obtaining cleaning related information from a user. A composition or part thereof for the individualized cleaning agent is determined based on the obtained cleaning related information. Optionally, the cleaning related information is provided.

An apparatus for determining a composition of an individualized cleaning agent is provided in another embodiment. The apparatus is configured to obtain cleaning related information from a user, and to determine a composition or part thereof for the individualized cleaning agent based on the obtained cleaning related information. The apparatus is optionally further configured for providing the cleaning related information.

A system for determining a composition of an individualed cleaning agent is provide in yet another embodiment. The system includes multiple apparatuses configured to obtain cleaning related information from a user, and to determine a composition or part thereof for the individualized cleaning agent based on the obtained cleaning related information. The system is optionally further configured for providing the cleaning related information.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

According to a first aspect of the present disclosure, a method is described, performed by at least one apparatus, the method comprising: obtaining from a user cleaning related information, and determining a composition or a part thereof for an individualized cleaning agent to be produced based on the obtained cleaning related information.

The user may be a consumer.

According to a second aspect, an apparatus is described configured for performing or comprising means techniques for performing the method according to the first aspect.

According to a third aspect, a system is described comprising multiple apparatuses, configured for performing or comprising techniques for performing the method according to the first aspect.

The respective techniques of employing an apparatus according to the second or third aspect can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

As an example, an apparatus according to the second or third aspect may comprise at least one processor and at least one memory including computer program code, the at least one memory and the computer program code configured to, with the at least one processor, cause an apparatus at least to perform the method according to the first aspect of the present disclosure.

Any of the described apparatuses may comprise additional components. Any of the described apparatuses may be a module or a component for a device, for example a chip. Alternatively, any of the described apparatuses may be a data processing device, for instance a server, a stationary device, or a mobile device. Any of the described apparatuses may for instance at least comprise a user interface (e.g. with inputs and/or outputs) and/or a communication interface.

An example of a mobile device may be a cellular phone, a laptop computer, a tablet computer, a multimedia player, a personal digital assistant, or a part thereof. A stationary device may in particular be a stationary terminal, such as a vending machine or an ordering terminal, for instance. A server is to be understood to mean, in particular, a data-processing unit in a network which communicates via the network with one or more data-processing units, the clients (e.g. the mobile devices), in order to provide them with special services. In a client-server architecture of this type, the special services provided by the server can be used by a plurality of clients so that the clients themselves, for example, do not need to be provided with a larger database or with certain capabilities. The network is, for example, a local area network, a wide area network, a virtual network, a radio network, a telephony network and/or the Internet. The communication is effected, for example, in a wireless or wire bound manner.

Thus, the system according to the third aspect may in particular comprise a client (in particular a mobile or stationary device) and a server. Optionally, the system may also comprise apparatuses for producing and/or packaging the cleaning agent to be produced.

According to a fourth aspect, a computer program code is described, the computer program code when executed by a processor causing an apparatus to perform the actions of the method according to the first aspect. The computer program code may in particular comprise or be an executable program, e.g. an "App" for a mobile device.

According to a fifth exemplary aspect of the present disclosure, a (e.g. non-transitory and/or tangible) computer readable storage medium is described in which computer program code according to the fourth aspect is stored. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like a memory stick or an optical disc.

It has been found, that complying with the user's individual needs with respect to cleaning agents can be achieved by first obtaining cleaning related information from the respective user. This is achieved in a convenient way for the user, as the user only needs to provide the respective cleaning related information. This information can subsequently advantageously be used to determine a composition for an individualized cleaning agent. A so produced cleaning agent will then comply with the user's needs without the need for a large portfolio of cleaning agents, as it comprises an individualized composition. Additionally, it may even be possible to provide cleaning agents with compositions, which compositions may not have been possible before, because the individualized cleaning agent may be produced and provided to the user without longer storage times of the cleaning agent. Thus, even combinations of ingredients less suitable for longer storage times may be provided, as the time frame of consumption may be significantly shorter. It is further advantageous that the user does not need to know about specific ingredients of a cleaning agent or their particular functions in a cleaning agent, as the composition can be determined based on cleaning related information on a higher level.

A cleaning related information may, for example, relate to a user preference or, as another example, to a property of the object to be cleaned with the cleaning agent, which will be explained in more detail below. However, a cleaning related information may also relate to information about the water (e.g. the water hardness) to be used with the cleaning agent. As another example the cleaning related information may also relate to a utensil (e.g. a brand and/or kind thereof) to be used with the cleaning agent, such as a washing machine.

The term "based on" is in particular understood to mean "at least based on". For example, the composition may also be determined based on other information or factors than the obtained cleaning related information.

"Obtaining information" may in particular comprise receiving said information, e.g. by receiving a corresponding signal. The cleaning related information may for example be obtained (directly) from a user at a mobile or stationary device, for example via an input, e.g. of the respective device of the user. The cleaning related information may also be obtained (indirectly) at a (remote) server, which receives the cleaning related information form another device, which has been used by the user to input the cleaning related information.

The composition may be representative of the complete composition of the cleaning agent or of only a part thereof. As the cleaning agent is to be produced based on or with said determined composition, the determined composition effects the actual production and the produced cleaning agent.

As an example, the composition or the part thereof may be determined by determining composition data. The composition data may for example comprise a data set representative of the composition or the part thereof. The composition data may for example comprise entries representative of or indicative for one or more ingredients and their (relative or absolute) respective amount. The composition data may then be used for producing the cleaning agent. Determining the composition may in particular comprise amending and/or creating a composition data (or a part thereof) for the individualized cleaning agent to be produced based on the obtained cleaning information.

According to an exemplary embodiment of the aspects as contemplated herein, the method further comprises: providing the cleaning related information.

"Providing information" may in particular comprise sending said information, e.g. by sending a corresponding signal. For instance, the cleaning related information may be provided by a first apparatus to a second apparatus, e.g. by a mobile device to a server. Thus, the mobile device may only need to obtain and provide the cleaning related information. A determining of the cleaning composition may then be performed by a server, which may obtain (e.g. receive) the cleaning related information from the mobile device.

According to an exemplary embodiment of the aspects as contemplated herein, the cleaning related information is representative of one or more user preferences of a user and/or one or more properties of one or more objects to be cleaned.

It has been found, that it is effectively possible to comply with the user's needs, when information representative of a user's preference(s) is taken into account for the production of an individualized cleaning agent. A preference may generally be understood to mean the favoring or privileging of an alternative or the bias of an individual for something, as explained by further examples in detail below. Properties of one or more objects to be cleaned may be understood to be intrinsic properties describing characteristics or qualities of the respective objects, as will also be explained by further examples below.

According to an exemplary embodiment of the aspects as contemplated herein, the cleaning related information representative of one or more user preferences of a user is at least representative of one or more of the following: a scent preference, an anti-malodor preference, a color preference, a shape preference, a rigidity preference, an aggregate state preference, an allergy preference, a hygiene preference, a cleaning preference, a biodegradation preference, and/or an ingredient preference.

As an example, a scent preference may in particular indicate a tonality and/or an intensity of the scent. The information representative of a scent preference can be used to determine the type and/or amount of scent in the composition or the part thereof and thus the actual cleaning agent to be produced.

As an example, an allergy preference may in particular indicate, whether the user (generally) prefers the omission or reduction of potentially allergic reaction provoking ingredients. The allergy preference may also indicate specific substances to be omitted or reduced in the cleaning agent. The composition or the part thereof can thus be determined accordingly. This is in particular advantageous for cleaning agents, which may come into contact with the skin of the user.

As an example, a hygiene preference may in particular indicate, whether the user prefers a cleaning agent with additional hygienic effects. The composition or the part thereof can thus be determined accordingly, e.g. to provide for a bleacher or quaternary ammonium compounds in the cleaning agent.

As an example, a cleaning preference may in particular indicate the preference of a user for a certain kind of cleaning agent, e.g. a cleaning agent for cleaning colored clothes or for an intended application of the cleaning agent, such as a beaching application. This may be considered when determining the composition or the part thereof, e.g. to provide for a bleacher or a dye transfer inhibitor.

As an example, a biodegradation preference may in particular indicate, whether the user prefers a cleaning detergent solely with or with an increased amount of biodegradable ingredients, in particular with natural ingredients (such as soap, vinegar, baking soda and/or essential oils).

As an example, an ingredient preference may in particular indicate the preference of a user for a specific ingredient. The ingredient preference may for example be indicative of an inclusion or exclusion of one or more ingredients or kinds of ingredients (e.g. preservatives).

According to an exemplary embodiment of the aspects as contemplated herein, the cleaning related information representative of one or more properties of one or more objects to be cleaned is at least representative of one or more of the following: an object type, an object contamination, an object label, an object color, and/or an object material.

As an example, an object type may indicate the type or kind of object, e.g. textiles, clothes, cushion or dishes, to name some examples.

As an example, an information representative of an object contamination may indicate the degree or level of the presence of an unwanted constituent, contaminant or impurity in the object to be cleaned, such as stains and/or dirt. The contamination may also indicate the kind or type of contamination (e.g. grass stains, gum stains, food stains, blood stains, etc.).

As an example, information representative of an object label may indicate a label or the information provided on the label of the object to be cleaned. For example, the label may be a care label or care tag or a part thereof, attached to objects to indicate how a particular object should best be cleaned. Information representative of an object label may for instance indicate a laundry symbol, also called a care symbol (which may be a pictogram representing a preferred method of washing, for example drying, dry-cleaning and ironing of textiles). Also, the label may carry information regarding the textile or confection composition.

The object label may also be a code, such as a QR code, or a chip, such as a NFC or RFID chip.

As an example, information representative of an object color may indicate the color(s) of the one or more objects to be cleaned, in the case of textiles e.g. white, black or colored.

As an example, an object material may indicate the material or kind of material, e.g. the kind of textile, such as wool, synthetic material, denim, etc. of the one or more objects to be cleaned.

According to an exemplary embodiment of the aspects as contemplated herein, the obtained cleaning related information also comprises information not influencing the composition for the individualized cleaning agent to be produced.

The cleaning related information may thus also comprise information, which may be generally related to the cleaning agent to be produced, but which may not influence the composition of the cleaning agent. For instance, information representative of a packaging preference of the user may be obtained. While this may influence the packaging of the cleaning agent, this may not necessarily influence the composition. As another example, the cleaning related information may comprise information representative of a quantity of the cleaning agent to be produced. While this may also influence e.g. the packaging of the cleaning agent, this may not necessarily influence the (relative) amounts of the ingredients of the composition. As another example, the cleaning related information may also comprise information indicative of a label of the packaging of the cleaning agent. This enables the possibility of individualized labels.

According to an exemplary embodiment of the aspects as contemplated herein the method further comprises: checking a compatibility of the obtained cleaning related information and/or the composition or the part thereof for the individualized cleaning agent to be produced.

In order to prevent the production of a cleaning agent with incompatible ingredients, the obtained cleaning related information and/or the composition or the part thereof may be checked for compatibility. For instance, an incompatibility of the cleaning related information may be recognized, in case they may lead to a cleaning agent with partly incompatible ingredients combined during the production of the cleaning agent. For instance, a compatibility of the cleaning related information may be recognized, in case they may lead to a cleaning agent with only compatible ingredients combined during the production of the cleaning agent. However, the determined composition or the part thereof may also be used for checking a compatibility. Incompatibility may be understood as leading to a cleaning agent, wherein during usual storing the effectiveness of one or more ingredients during use may be deteriorated or provably reduced. For example, bleach and ammonia may be understood as being not compatible ingredients, as they react and change.

The checking may in particular be used for preventing the user from providing cleaning related information showing an incompatibility. For instance, the user may only select or provide cleaning related information to the apparatus which show compatibility. For instance, if the user selects certain object properties, these properties may be checked against other object properties or user preferences, so that only compatible further properties or user preferences may be available for the user to select from.

In this regard and according to an exemplary embodiment of the aspects as contemplated herein the method further comprises: notifying or triggering notifying the user, if the checking of compatibility is unsuccessful.

For instance, the user may be notified via an output of an apparatus (e.g. the mobile device). For instance, the user may be notified by displaying a message or by playing a sound. The user may then provide different cleaning related information. In case the checking of compatibility is successful, the cleaning related information or the composition may be accepted, for example.

According to an exemplary embodiment of the aspects as contemplated herein, the determining of the composition or the part thereof for the individualized cleaning agent to be produced comprises supplementing a predefined base composition.

It has been found that a sufficient degree of individualization of the cleaning agent can be achieved by supplementing a predefined base composition. This may also reduce the complexity of the determination. For instance, determining the composition or the part thereof may thus be reduced to only determining supplementary ingredients to be added to the predefined base composition. A predefined base composition may provide for a predefined combination and/or a predefined amount of ingredients.

That the (base) composition provides for a certain ingredient is in particular understood to mean that the composition will lead to a cleaning agent with the particular ingredient.

Preferably, the base composition may be dependent on obtained location information (e.g. representative of the location of a (mobile) device of the user and thus the user's location). Thus, the base composition may be a location specific base composition. For instance, the base composition may be dependent on the country, the city, the region and/or the area, the user is located in. Thereby, location specific circumstances (such as local user habits, local water properties, such as water hardness) can be taken into account.

Thus, exemplary embodiments of the aspects as contemplated herein may also comprise: obtaining location information representative of the user's location. The location information may for example be derived from at least one of: a Global Navigation Satellite System (GNSS), a Wireless Local Area Network (WLAN) system, a Bluetooth (BT) system, a Radio Frequency Identification (RFID) system, a cellular network system, one or more sensors, and/or a manual input.

According to an exemplary embodiment of the aspects as contemplated herein, the determining of the composition or the part thereof for the individualized cleaning agent to be produced comprises selecting one or more predefined composition modules.

It has been found that a set of predefined composition modules can be used in order to further reduce the complexity of determining a composition or a part thereof for an individualized cleaning agent. A predefined composition module may provide for a predefined combination and/or a predefined amount of ingredients. The composition modules may in particular supplement the predefined base composition.

Preferably, a composition module provides for ingredients at least in part not provided by the base composition.

According to an exemplary embodiment of the aspects as contemplated herein, at least one of the one or more predefined composition modules influence the scent, the cleaning power, the bleaching power, and/or the dye transfer property of the individualized cleaning agent to be produced.

As an example, one or more composition modules may selectively influence the scent of the individualized cleaning agent to be produced. Such a composition module may for example at least provide for (e.g. to be added to a base composition) a scent for the individualized cleaning agent to be produced.

As an example, a composition module influencing the cleaning power may for example at least provide for a soap, a bleacher, and/or an enzyme for the individualized cleaning agent to be produced.

As an example, a composition module influencing the bleaching power may for example at least provide for a bleacher for the individualized cleaning agent to be produced.

As an example, a composition module influencing the dye transfer property may for example at least provide for a dye transfer inhibitor (DTI) for the individualized cleaning agent to be produced.

As an example, a composition module (e.g. a bleach module) may at least provide for one or more of the following ingredients: soap speckles (e.g. colored), sodium carbonate, sodium percarbonate, TAED (e.g. white or coloured), bleach catalysts, soil release polymer, enzymes (e.g. a multienzyme mix), photobleach, optical brightener, silicone defoamer and/or sodium sulfate.

As an example, a composition module (e.g. a color module) may at least provide for one or more of the following ingredients: citric acid monohydrate, sodium citrate, soap speckles (e.g. colored), sodium hydrogen carbonate, soil release polymer, DTI-Polymers, enzymes (e.g. a multienzyme mix), silicone defoamer and/or sodium sulfate.

As an example, a composition module (e.g. a 2-in-1 module) may at least provide for one or more of the following ingredients: soap speckles (e.g. colored), sodium hydrogen carbonate, bentonite, polyquaternium and/or sodium sulfate.

As an example, a composition module (e.g. a sensitive module) may at least provide for one or more of the following ingredients: soap speckles (e.g. white), sodium carbonate, sodium percarbonate, TAED (e.g. white or colored), bleach catalysts (optional), soil release polymer, enzymes (e.g. a multienzyme mix), photobleach, optical brightener, FS granulate aloe vera, silicone defoamer and/or sodium sulfate.

As an example, a composition module (e.g. a sensitive color module) may at least provide for one or more of the following ingredients: citric acid monohydrate, sodium citrate, FS granulate aloe vera, soap speckles (e.g. white), sodium hydrogen carbonate, soil release polymer, DTI-Polymers, enzymes (e.g. a multienzyme mix), silicone defoamer and/or sodium sulfate.

As an example, a composition module (e.g. a perfume module) may at least provide for one or more of the following ingredients: perfume (e.g. FS Granulate Perfume caps and/or M-Dry perfume caps), zeolite, perfume oil and/or sodium sulfate.

According to an exemplary embodiment of the aspects as contemplated herein, the determining of the composition or the part thereof for the individualized cleaning agent to be produced comprises modifying a predefined base composition.

For instance, one or more ingredients provided for by a predefined base composition may be removed. For instance, an amount of one or more ingredients provided for by a predefined base composition may be changed. As an example, modifying a predefined base composition may be dependent on the selection of a predefined composition module. For instance, the amount of one or more ingredients provided for by the base composition may be dependent on the specific predefined composition module (s) selected.

According to an exemplary embodiment of the aspects as contemplated herein, the composition or the part thereof, in particular the base composition, for the individualized cleaning agent to be produced provides for one or more of the following ingredients: at least one surfactant, at least one acid, at least one base, at least one bleacher, at least one enzyme, at least one builder, at least one scent, at least one dye, at least one oil, at least one brightener, and/or at least one polymer.

Surfactants, acids, bases, bleachers and/or enzymes may be considered as active ingredients, while the further ingredients may be considered as passive ingredients.

"At least one" is understood to mean one or more, e.g. 1, 2, 3, 4, 5, 6, 7, 8, 9 or more. With respect to ingredients of the described composition the term "at least one" refers to the type of ingredient and not to the absolute number of molecules, for example. For instance, at least one surfactant is understood to mean one or more surfactants, i.e. one or more types or kinds of surfactants.

As an example, the composition for the individualized cleaning agent to be produced may provide for one or more of the following ingredients: $C_{12-18}$ fatty alcohol with about 7 EO, $C_{12-18}$ fatty alcohol sulfate with about 7 EO (sodium salt), linear alkylbenzol sulfonate (sodium salt), linear alkyl-benzol sulfonate (sodium slat) (e.g. Thonyl, Ufaryl), sodium carbonate, sodium hydrogen carbonate, sodium disilicate, polyacrylates (sodium salt), carboxymethylcellulose, sodium phosphonate and/or sodium sulfate.

According to an exemplary embodiment of the aspects as contemplated herein, the method further comprises: providing information representative of the determined composition or the part thereof for the individualized cleaning agent to be produced.

As an example, the information representative of the determined composition or the part thereof may be provided by a first apparatus (e.g. a mobile device) to a second apparatus (e.g. a server). As another example, the respective information may also be provided by a server to a production factory for producing the cleaning agent.

According to an exemplary embodiment of the aspects as contemplated herein, the method further comprises: producing or triggering producing the cleaning agent to be produced based on the determined composition or the part thereof.

As an example, the cleaning agent may be produced in a facility or production factory, which may be remote from the user. Thus, the production may in particular be based on the obtained information representative of the determined composition or the part thereof. However, as another example it may also be possible, that the cleaning agent is produced locally at the user's position, e.g. in a stationary terminal, such as a vending machine.

According to an exemplary embodiment of the aspects as contemplated herein, the method further comprises: packaging or triggering packaging the cleaning agent. Preferably, the cleaning agent is packaged at the place of production of the cleaning agent, as described above. For instance, the packaging of the cleaning agent may be based on an obtained packaging preference. A packaging may consist of or comprise plastic foil, a doy-bag, a bottle and/or a (carton) box, for example. The packaging may be a re-closable packaging, for example.

According to an exemplary embodiment of the aspects as contemplated herein, the method further comprises: providing the packaging for the cleaning agent with information on the ingredients of the cleaning agent.

For this, the method may also comprise an extraction of an ingredient declaration from the determined composition or the part thereof (or obtained information representative thereof) for the packaging. In particular, the method may also comprise providing the packaging for the cleaning agent with a label according to the CLP regulation (Classification, Labeling and Packaging of Substances and Mixtures). Necessary information for a label according to the CLP regulation may also be extracted from the determined composition or the part thereof (or obtained information representative thereof).

According to an exemplary embodiment of the aspects as contemplated herein, the method further comprises: providing the packaged cleaning agent. The packaged cleaning agent may be provided to the user or to a person or address which has been indicated by the user. The packaged cleaning agent may in particular be shipped by a third party. In case the production and packaging is preformed locally (e.g. in a stationary machine), the packaged cleaning agent may also be provided to the user by the stationary machine.

According to an exemplary embodiment of the aspects as contemplated herein, the cleaning agent is a household detergent, in particular a laundry detergent. However, other household detergents, such as dish washing detergents may also be possible. Accordingly, the objects to be cleaned may in particular be objects such as dishes or textiles, in particular clothes.

According to an exemplary embodiment of the aspects as contemplated herein, the cleaning agent is a household detergent, in particular a laundry detergent or an automatic dishwasher detergent, preferably a laundry detergent.

According to an exemplary embodiment of the aspects as contemplated herein, the cleaning agent is a powder, foam, gel or liquid. In particular for laundry detergents, a powder or gel is preferred.

The features and example embodiments of the present disclosure described above may equally pertain to the different aspects according to the present disclosure.

It is to be understood that the presentation of embodiments as contemplated herein is merely exemplary and non-limiting.

DETAILED DESCRIPTION OF THE FIGURES

FIG. 1 shows a schematic illustration of an exemplary embodiment of a system 1 as contemplated herein. The system of FIG. 1 comprises an apparatus in form of a mobile device 2 of a user. The components of the mobile device 2 are described in more detail with respect to FIG. 2. In FIG. 1, mobile device 2 is inter alia configured to obtain from a user cleaning related information.

The system 1 further comprises a server 4. The mobile device 2 and the server 4 are configured to communicate with each other over a network in a wireless or wire bound manner. The network is, for example, a local area network, a wide area network, a virtual network, a radio network, a telephony network and/or the Internet.

Generally, both the mobile device 2 and the server 4 may perform individually or together a method as contemplated herein.

Figure 2:
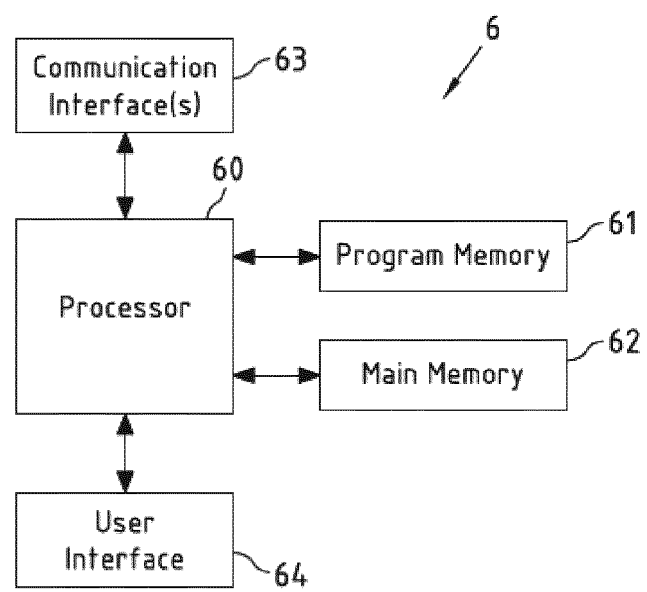
FIG. 2 is a block diagram of an exemplary embodiment of a system and apparatus as contemplated herein.

FIG. 2 is a block diagram of an exemplary embodiment of an apparatus 6 as contemplated herein, e.g. of mobile terminal 2 or server 4 of FIG. 1. For instance, the apparatus 2 is or forms a part (e.g. as a module) of mobile device. Non-limiting examples of a mobile device are a cellular phone, a personal digital assistant, a laptop computer, a tablet computer or a multimedia player.

Apparatus 6 comprises a processor 60. Processor 60 may represent a single processor or two or more processors, which are for instance at least partially coupled, for instance via a bus. Processor 60 executes a program code stored in program memory 61 (for instance program code causing apparatus 6 to perform an embodiment of a method as contemplated herein (for instance further described below with reference to FIG. 3), when executed on processor 60), and interfaces with a main memory 62. Some or all of memories 61 and 62 may also be included into processor 60. One of or both of memories 61 and 62 may be fixedly connected to processor 60 or at least partially removable from processor 60, for instance in the form of a memory card or stick. Program memory 61 may for instance be a non-volatile memory. It may for instance be a FLASH memory, any of a ROM, PROM, EPROM and EEPROM memory or a hard disc, to name but a few examples. Program memory 61 may also comprise an operating system for processor 60. Program memory 61 may for instance comprise a first memory portion that is fixedly installed in apparatus 6, and a second memory portion that is removable from apparatus 6, for instance in the form of a removable SD memory card. Main memory 62 may for instance be a volatile memory. It may for instance be a RAM or DRAM memory, to give but a few non-limiting examples. It may for instance be used as a working memory for processor 60 when executing an operating system and/or programs.

Processor 60 further controls a communication interface 63 configured to receive and/or output information. For instance, communication interface 63 may be configured to send signals to, receive signals from and exchange information with another apparatus (e.g. server 4 of system 1 of FIG. 1). This may for instance comprise sending information or data (e.g. cleaning related information or information representative of a composition or a part thereof) to and/or receiving information or data from the respective other apparatus (e.g. server 4). The communication may in particular be based on a wireless connection. Accordingly, communication interface 63 may for instance comprise circuitry such as modulators, filters, mixers, switches and/or one or more antennas to allow transmission and/or reception of signals. For instance, communication interface 63 is configured to allow communication according to a 2G/3G/4G/5G cellular communication system and/or a non-cellular communication system, such as for instance a WLAN network. Nevertheless, the communication route between mobile device 2 and server 4 may equally well at least partially comprise wire-bound portions.

Processor 60 further controls a user interface 64 configured to present information to a user of apparatus 6 and/or to receive information from such a user (e.g. the user of mobile device 2). Such information may for instance comprise cleaning related information. User interface 64 may for instance be the standard user interface via which a user of apparatus 6 interacts with apparatus 6 to control other functionality thereof, such as making phone calls, browsing the Internet, etc. The user interface 64 may for instance comprise an input (such as a keyboard, a mouse, a microphone, a touch panel, a touch screen, etc.) and/or an output (a screen, a speaker, etc.).

The components 61-64 of apparatus 6 may for instance be connected with processor 60 by employing one or more serial and/or parallel busses.

Figure 3:
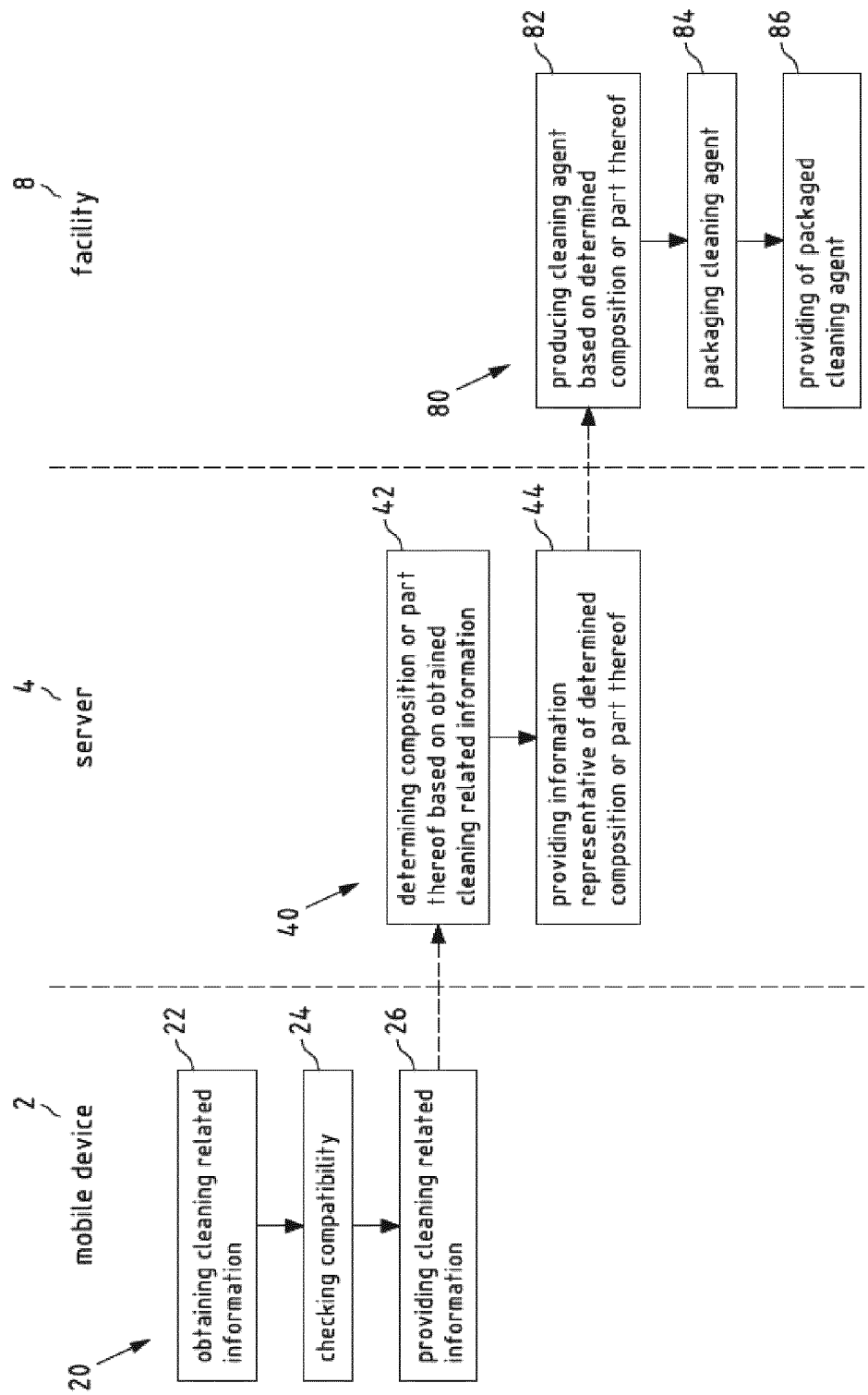
FIG. 3 shows a flow chart illustrating an exemplary embodiment of a method as contemplated herein.

FIG. 3 shows flow charts 20, 40, 80 illustrating an exemplary embodiment of a method as contemplated herein, in this case performed by apparatus 2 and apparatus 4 of FIG. 2 and a production facility 8.

The following example embodiment is of a method as contemplated herein is described with respect to a laundry detergent. However, the method may as well be applied to the production of other cleaning agents. While the method is in this case performed by a system comprising (at least) three apparatuses 2, 4, 8, the method may also be performed by different systems (e.g. with more or less apparatuses) or by a single apparatus, for example.

According to the exemplar embodiment, a user inputs cleaning related information into a mobile device 2, e.g. via a user interface, such as user interface 64 described above. The user may for example input information representative of one or more user preferences of the user and/or one or more properties of one or more objects to be cleaned.

For example, the user may input (e.g. over a touchscreen of the mobile device) information about his user preferences (such as a scent preference, an allergy preference, an hygiene preference, a cleaning preference, a biodegradation preference, and/or an ingredient preference). Also the user may input (e.g. over a touchscreen of the mobile device) information about properties of the object(s) to be cleaned.

As an example, in a user friendly way, the user may be provided with one or more (e.g. a set of) questions regarding cleaning related information via the output of the mobile device 2. The answers input by the user into the mobile device 2 via the input then provide the cleaning related information to the mobile device 2. Preferably, the user may only provide a limited amount of cleaning related information (e.g. a limited number of user preferences and/or object properties).

Accordingly, the mobile device 2 can obtain the cleaning related information from the user (action 22).

After obtaining the cleaning related information or a part thereof, the mobile device 2 checks the compatibility of the obtained cleaning related information. As one example, if the user has input non-compatible cleaning related information, a warning message may be output for the user. The user can then select different cleaning related information. As another example, the cleaning related information input to the mobile device 2 may also be checked for compatibility against further not yet selected cleaning related information and the non-compatible cleaning related information may be marked as non-selectable, so that the user can only select compatible cleaning related information. This prevents the production of a cleaning agent with incompatible ingredients.

In case it is found that the cleaning related information is compatible, the mobile device 2 provides the cleaning related information to the server 4 (action 26). The cleaning related information is thus obtained at server 4 from the user via mobile device 2.

In the illustrated embodiment, the server 4 then determines a composition or a part thereof for an individualized cleaning agent to be produced based on the obtained cleaning related information (action 42). The determining, however, may also be performed by the mobile device 2, for example.

In the following table 1 nine examples of a determined composition of a powder laundry detergent are provided. The ingredients are provided in wt.-%.

The upper part of table 1 provides a base composition, which is substantially the same for the different examples. Only LAS is added via post addition in different amounts in dependence of the predefined composition modules. The predefined composition modules are provided in the lower part of table 1. Their respective composition is provided in the following tables 2-7.

In example 1, it is determined from the cleaning related information provided by the user that a universal detergent is needed (e.g. because cleaning related information has been obtained indicating that clothes with general contamination shall be cleaned and the user has not provided any further preferences regarding scent etc.). In example 2, it is determined that a universal detergent with a certain scent is needed (e.g. because a certain scent preference has been obtained from the user). In example 3, it is determined that a color detergent is needed (e.g. because cleaning related information has been obtained from the user indicating that colored clothes should be cleaned). In example 4, it is determined that a color 2-in-1 detergent is needed (e.g. because cleaning related information has been obtained from the user indicating that colored clothes should be cleaned and that the laundry detergent shall also have fabric softener properties). In example 5, it is determined that a universal 2-in-1 detergent is needed. In example 6, it is determined that both, bleaching and color protection functionality is necessary (e.g. because cleaning related information has been obtained from the user indicating that various colored objects should be cleaned). In example 7, it is determined that a basic detergent with a freshening effect is needed. In example 8, it is determined that a sensitive universal detergent is needed. In example 9, it is determined that a sensitive color detergent is needed.

An example composition of the perfume module C and for each further module is provided in tables 2-7 below. The ingredients are provided in wt.-%.

TABLE 2

| Bleach module | |
| --- | --- |
| Soap speckles (e.g. colored) | 10 |
| Sodium carbonate | 10 |
| Sodium percarbonate | 35 |
| TAED (e.g. white or colored) | 15 |
| Bleach catalysts | 1 |
| Soil release polymer | 0.5 |
| Multienzyme mix | 3.5 |
| Photobleach | 0.03 |
| Optical brightener | 0.8 |

TABLE 1

| | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| C12-18 fatty alcohol with 7 EO | 2 | 2 | 2 | 2 | 2 | 2 | 2 | 2 | 2 |
| C12-18 fatty alcohol sulfate with 7 EO (sodium salt) | 1.5 | 1.5 | 1.5 | 1.5 | 1.5 | 1.5 | 1.5 | 1.5 | 1.5 |
| Linear alkylbenzol sulfonate (sodium salt) | 5 | 5 | 5 | 5 | 5 | 5 | 5 | 5 | 5 |
| LAS (sodium salt) via post addition | 5 | 0 | 7 | 7 | 3 | 2 | 5 | 2 | 2 |
| Sodium carbonate | 20 | 20 | 20 | 20 | 20 | 20 | 20 | 20 | 20 |
| Sodium hydrogen carbonate | 2 | 2 | 2 | 2 | 2 | 2 | 2 | 2 | 2 |
| Sodium disilicate | 4 | 4 | 4 | 4 | 4 | 4 | 4 | 4 | 4 |
| Polyacrylates (sodium salt) | 3 | 3 | 3 | 3 | 3 | 3 | 3 | 3 | 3 |
| Carboxymethylcellulose | 1 | 1 | 1 | 1 | 1 | 1 | 1 | 1 | 1 |
| Sodium phosphonate | 1 | 1 | 1 | 1 | 1 | 1 | 1 | 1 | 1 |
| Sodium sulfate | Ad. 100 | Ad. 100 | Ad. 100 | Ad. 100 | Ad. 100 | Ad. 100 | Ad. 100 | Ad. 100 | Ad. 100 |
| Perfume Module A | 10 | — | — | — | — | — | — | — | — |
| Perfume Module B | — | — | 10 | 10 | — | — | — | — | — |
| Perfume Module C | — | 10 | — | — | — | 10 | 10 | — | — |
| Perfume Module sensitive | — | — | — | — | — | — | — | 10 | 10 |
| Bleach Module | 35 | 20 | — | — | 35 | 20 | — | 20 | — |
| Color Module | — | — | 35 | 35 | — | 20 | — | — | — |
| 2 in 1 Module | — | — | — | 35 | 35 | — | — | — | — |
| Sensitive Module | — | — | — | — | — | — | — | 35 | — |
| Sensitive Color Module | — | — | — | — | — | — | — | — | 35 |

TABLE 2-continued

Bleach module

| | |
|---|---|
| Silicone defoamer | 0.9 |
| Sodium sulfate | Ad. 100 |

TABLE 3

Color module

| | |
|---|---|
| Citric acid monohydrate | 5 |
| Sodium citrate | 5 |
| Soap speckles (e.g. colored) | 10 |
| Sodium hydrogen carbonate | 15 |
| Soil release polymer | 0.5 |
| DTI-Polymers | 0.35 |
| Multienzyme mix | 3.5 |
| Silicone defoamer | 0.7 |
| Sodium sulfate | Ad. 100 |

TABLE 4

2in1 module

| | |
|---|---|
| Soap speckles (e.g. colored) | 5 |
| Sodium hydrogen carbonate | 10 |
| Bentonite | 35 |
| Polyquaternium | 1 |
| Sodium sulfate | Ad. 100 |

TABLE 5

Sensitive module

| | |
|---|---|
| Soap speckles (e.g. white) | 10 |
| Sodium carbonate | 10 |
| Sodium percarbonate | 35 |
| TAED (e.g. white or colored) | 15 |
| Bleach catalysts (optional) | 1 |
| Soil release polymer | 0.5 |
| Multienzyme mix | 3.5 |
| Photobleach | 0.03 |
| Optical brightener | 0.8 |
| Perfume granulate | 0.8 |
| Silicone defoamer | 0.9 |
| Sodium sulfate | Ad. 100 |

TABLE 6

Sensitive color module

| | |
|---|---|
| Citric acid monohydrate | 5 |
| Sodium citrate | 5 |
| Perfume Granulate | 0.8 |
| Soap speckles (e.g. white) | 10 |
| Sodium hydrogen carbonate | 15 |
| Soil release polymer | 0.5 |
| DTI-Polymers | 0.35 |
| Multienzyme mix | 3.5 |
| Silicone defoamer | 0.7 |
| Sodium sulfate | Ad. 100 |

TABLE 7

Perfume module C

| | |
|---|---|
| Granulated Perfume microcapsules | 5 |
| Dry perfume microcapsules | 5 |

TABLE 7-continued

Perfume module C

| | |
|---|---|
| Zeolite | 10 |
| Perfume oil | 3 |
| Sodium sulfate | Ad. 100 |

The further perfume modules may be provided in a similar manner, but with different types and/or amounts of perfumes, for example.

In the illustrated example, information representative of the determined composition or the part thereof for the individualized cleaning agent to be produced is provided from the server 4 to a facility 8 (action 44).

The facility provides techniques and/or apparatuses for producing and packaging the cleaning agent. Thus, the cleaning agent is produced based on the determined composition or the part thereof (action 82). Subsequently, the cleaning agent is packaged (action 84). The package may be provided with a label. Under certain circumstances the label is printed on the packaging. The label may be individualized based on information provided by the user, for example. Further, the label comprises an ingredient declaration based on the determined composition or the part thereof (or obtained information representative thereof), e.g. according to the CLP regulation.

Thereafter, the packaged and labeled cleaning agent is provided to the user (action 86). This may however, be performed by a third party shipping company, for example. The user is provided with an individualized laundry agent matched to the individual needs of the user.

Figure 4:
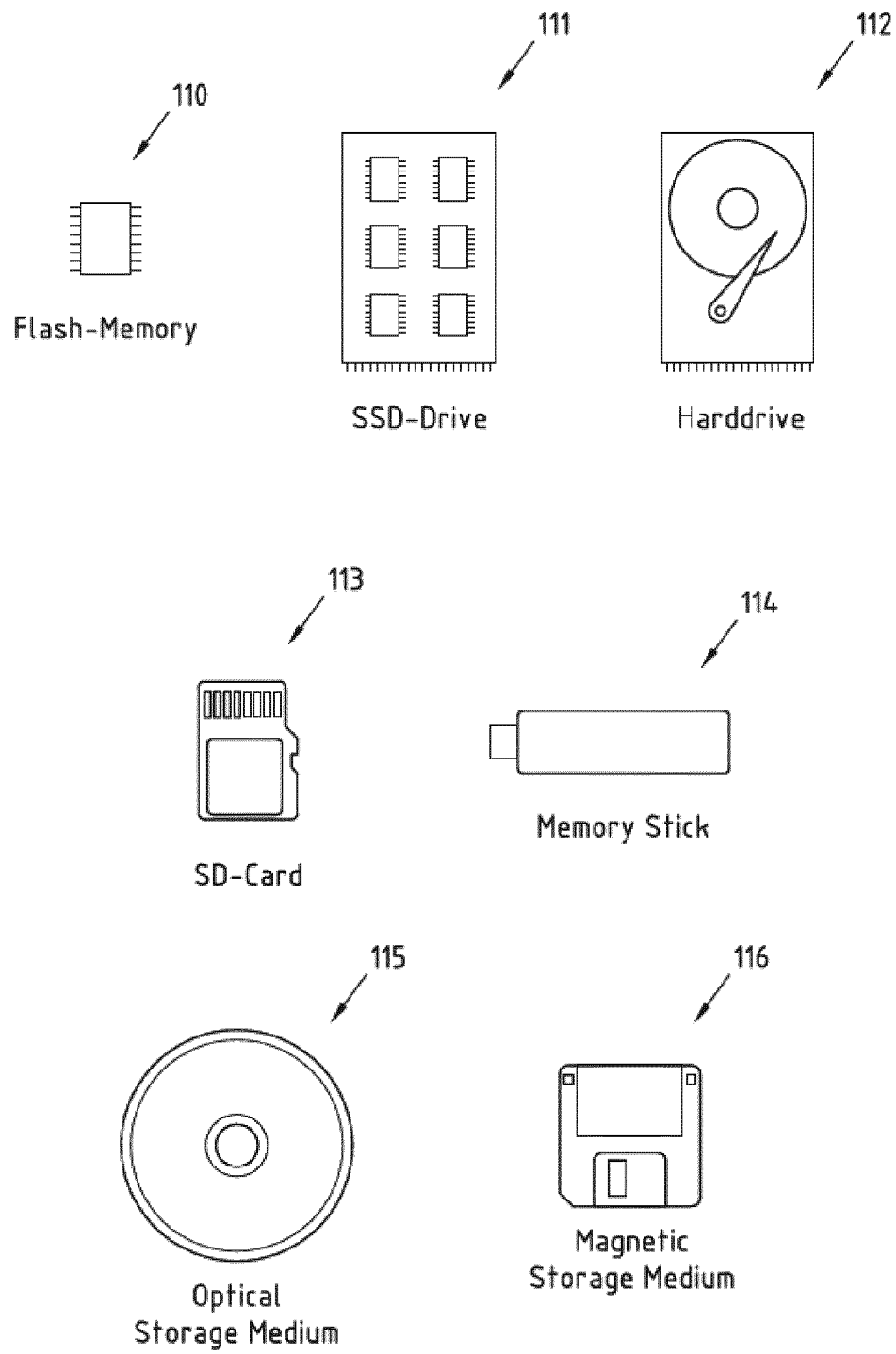
FIG. 4 is a schematic illustration of examples of tangible storage media according to the present disclosure.

FIG. 4 illustrates examples of tangible storage media that may for instance be used to implement program memory 61 of FIG. 2. To this end, FIG. 4 displays a flash memory 110, which may for instance be soldered or bonded to a printed circuit board, a solid-state drive 111 comprising a plurality of memory chips (e.g. Flash memory chips), a magnetic hard drive 112, a Secure Digital (SD) card 113, a Universal Serial Bus (USB) memory stick 114, an optical storage medium 115 (such as for instance a CD-ROM or DVD) and a magnetic storage medium 116.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 60 of FIG. 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method, performed by at least one apparatus, the method comprising:
   obtaining from a user cleaning related information, and
   determining one of a composition, and a part thereof for an individualized cleaning agent to be produced based on the obtained cleaning related information, wherein the method further comprises:
   providing the cleaning related information;
   checking for incompatibility of components of the composition which will lead to the reduction of effectiveness of at least one of the ingredients for the individualized cleaning agent to be produced which will lead to the reduction of effectiveness of at least one of the ingredients during storage time of the composition for a user's individual needs;
   if the incompatibility of components of the composition are compatible, physically mixing components of the composition to form the composition; and
   providing the composition by modifying a predefined base composition, wherein the base composition is selected depending on a user's location.

2. The method according to claim 1, wherein the cleaning related information is representative of one or more user preferences of the user and/or one or more properties of one or more objects to be cleaned, wherein;
   a) the cleaning related information representative of the one or more user preferences of the user is at least representative of one or more of the following:
      a scent preference,
      an anti-malodor preference,
      a color preference,
      a shape preference,
      a rigidity preference,
      an aggregate state preference,
      an allergy preference,
      an hygiene preference,
      a cleaning preference,
      a biodegradation preference, and/or
      an ingredient preference; and/or
   b) the cleaning related information representative of the one or more properties of the one or more objects to be cleaned is at least representative of one or more of the following:
      an object type,
      an object contamination,
      an object label,
      an object color, and/or
      an object material.

3. The method according to claim 2, wherein the obtained cleaning related information also comprises information not influencing the composition for the individualized cleaning agent to be produced.

4. The method according to claim 1, wherein the method further comprises:
   checking a compatibility of one of a plurality of components of the composition, and part thereof for the individualized cleaning agent to be produced, wherein optionally the method further comprises:
   notifying the user, if the checking of compatibility is unsuccessful.

5. The method according to claim 4, wherein modifying a predefined base composition, wherein the base composition is selected depending on a user's location comprises supplementing a predefined base composition with a compatible supplement.

6. The method according to claim 4, wherein the method further comprises:
   triggering packaging the cleaning agent.

7. The method according to claim 1, wherein the determining of the composition or the part thereof for the individualized cleaning agent to be produced comprises selecting one or more predefined composition modules, wherein optionally at least one of the one or more predefined composition modules influence a scent, a cleaning power, a bleaching power, and/or a dye transfer property of the individualized cleaning agent to be produced.

8. The method according to claim 1, wherein the composition or the part thereof, for the individualized cleaning agent to be produced provides for one or more of the following ingredients: at least one surfactant, at least one acid, at least one base, at least one bleacher, at least one enzyme, at least one builder, at least one scent, at least one dye, at least one oil, at least one brightener, and/or at least one polymer.

9. The method according to claim 1, wherein the method further comprises:
   providing information representative of the determined composition or the part thereof for the individualized cleaning agent to be produced.

10. The method according to claim 1, wherein the method further comprises:
    producing or triggering producing the cleaning agent to be produced based on the determined composition or the part thereof.

11. The method according to claim 1, wherein the method further comprises:
 providing the packaging for the cleaning agent with information on the ingredients of the cleaning agent.

12. The method according to claim 1, wherein the method further comprises:
 providing the composition in powder form.

13. The method according to claim 1, wherein the cleaning agent is a household detergent.

\* \* \* \* \*